United States Patent
Kinjarapu et al.

(10) Patent No.: US 10,483,740 B1
(45) Date of Patent: Nov. 19, 2019

(54) FLOOR BOARD JUNCTION BOX

(71) Applicant: KONE CORPORATION, Helsinki (FI)

(72) Inventors: Arvind Kinjarapu, Allen, TX (US); Håkan Bärneman, Frisco, TX (US); Areli Borrego, Matamoros Coahuila (MX); Martti Juurioksa, Allen, TX (US); Rodolfo Jasso, Allen, TX (US)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 16/159,314

(22) Filed: Oct. 12, 2018

(51) Int. Cl.
  *B66B 1/00* (2006.01)
  *H02G 3/12* (2006.01)
  *B66B 11/00* (2006.01)

(52) U.S. Cl.
  CPC ........... *H02G 3/123* (2013.01); *B66B 11/001* (2013.01)

(58) Field of Classification Search
  CPC ....................................................... H02G 3/123
  USPC ............................................................ 174/520
  See application file for complete search history.

(56) References Cited

U.S. PATENT DOCUMENTS

| | | | | |
|---|---|---|---|---|
| 6,223,860 B1* | 5/2001 | Namba | ............... | B66B 11/001 187/277 |
| 6,969,939 B1* | 11/2005 | Swensrud | ............... | H02K 3/12 310/201 |
| 2008/0108230 A1* | 5/2008 | Kasai | ............... | H05K 3/306 439/74 |
| 2010/0101857 A1* | 4/2010 | Miyamoto | ............... | H01R 9/2466 174/559 |
| 2010/0270109 A1* | 10/2010 | McCarthy | ............... | B66B 13/22 187/247 |
| 2015/0375962 A1* | 12/2015 | Hamlett | ............... | B66B 5/022 187/247 |
| 2017/0107081 A1* | 4/2017 | Kim | ............... | B66B 5/16 |
| 2017/0222577 A1* | 8/2017 | Anderson | ............... | B66B 1/304 |

* cited by examiner

*Primary Examiner* — Stanley Tso
(74) *Attorney, Agent, or Firm* — Birch, Stewart, Kolasch & Birch, LLP (57) ABSTRACT

A method for installing at least one junction box in an elevator hoistway of an elevator includes providing at least one junction box, the junction box including a plurality of knock-out portions, knocking out at least one of the plurality of knock-out portions of the at least one junction box to form a respective aperture, and affixing at least one PCB board to the respective aperture. An elevator includes at least one junction box, including at least one PCB board affixed to an aperture of at least one junction box via holders and an integrated multi-conductor coil wired to each PCB board; a duct connector connected to the at least one junction box; and a plurality of wiring ducts connected to the duct connector.

12 Claims, 8 Drawing Sheets

FLOOR BOARD JUNCTION BOX

BACKGROUND OF THE INVENTION

1. Field of the Invention

The present invention is directed to a method for installing at least one junction box in an elevator hoistway of an elevator. The present invention is also directed to an elevator including at least one junction box installed therein.

2. Description of the Background Art

It is known to first assemble each shaft signalization bundle in a factory and then to test each assembled bundle. After testing, the bundle is disassembled and the different PCB's are installed in respective metallic boxes at each respective floor. This whole installation process requires a lot of work.

SUMMARY OF THE INVENTION

A first aspect of the present invention is directed to a method for installing at least one junction box in an elevator hoistway of an elevator, the method including providing at least one junction box, the junction box including a plurality of knock-out portions; knocking out at least one of the plurality of knock-out portions of the at least one junction box to form a respective aperture; and affixing at least one PCB board to the respective aperture.

According to another aspect of the present invention, the at least one PCB board includes a plurality of PCB boards and an integrated multi-conductor coil wired to each of the PCB boards.

According to a further aspect of the present invention, the at least one junction box is fixed at an upper portion of the elevator hoistway or at a portion near a middle of travel of an elevator car.

According to yet another aspect of the present invention, the plurality of PCB boards includes at least one of a hoistway access control ("HAC"), a floor control board ("FBC") and a floor option board ("FOB").

According to another aspect of the present invention, the at least one junction box is provided with integrated box flaps, and wherein the method further comprises fixing the at least one junction box to a duct connection using the integrated box flaps.

According to yet another aspect of the present invention, the elevator includes a plurality of landings and at least one of a seismic device, a door lock switch, a door sensor and a stop switch, wherein the method further comprises: electrically connecting the at least one junction box to a controller via the duct connection; electrically connecting the at least one of the seismic device, door lock switch, door sensor and stop switch to the at least one junction box through the duct connection; and electrically connecting hall call buttons to the at least one junction box from each of the plurality of landings.

According to a further aspect of the present invention, each of the seismic device, the door lock switch, the door sensor and the stop switch are wired to the at least one junction box.

According to another aspect of the present invention, the elevator further includes at least two landings, a controller, a wire duct and landing fixtures, and wherein the at least two landings, the elevator control unit, the wire duct and the landing fixtures are connected to the at least one junction box.

According to yet another aspect of the present invention, the at least one junction box is connected to the controller via a serial data bus.

According to a further aspect of the present invention, the serial data bus is a local operating network ("LON") bus or a controlled area network ("CAN") bus.

According to another aspect of the present invention, the at least one junction box includes a plurality of junction boxes, wherein the elevator includes more than four floors, and wherein one of the plurality of junction boxes is fixed to the elevator hoistway every four floors.

A second aspect of the present invention is directed to a method for installing at least one junction box in an elevator hoistway of an elevator, the method including providing at least one junction box, wherein each junction box includes: an integrated multi-conductor coil; and a plurality of knock-out portions; knocking out at least one of the plurality of knock-out portions of the at least one junction box to form a respective aperture; affixing a PCB board to a respective aperture via a respective holder; and wiring the integrated multi-conductor coil to the PCB board.

The at least one PCB board is affixed to the respective holder via a fastening device.

According to another aspect of the present invention, the at least one junction box is provided with integrated box flaps, and the method further comprises fixing the at least one junction box to a duct connection using the integrated box flaps.

According to a further aspect of the present invention, the elevator includes a plurality of landings, wherein the method further comprises: electrically connecting the at least one junction box to a controller via the duct connection; electrically connecting a lay-in duct cable via the duct connection to a connector strip of the at least one junction box; and electrically connecting hall call buttons into the at least one junction box from each of the plurality of landings.

According to yet another aspect of the present invention, the elevator further includes at least two landings, an elevator control unit, a wire duct and landing fixtures, and wherein the at least two landings, the elevator control unit, the wire duct and the landing fixtures are connected to the at least one junction box.

A third aspect of the present invention is directed to an elevator including at least one junction box including: at least one PCB board, wherein each PCB board is affixed to an aperture of the at least one junction box via holders; and an integrated multi-conductor coil wired to each PCB board; a duct connector connected to the at least one junction box; and a plurality of wiring ducts connected to the duct connector.

According to another aspect of the present invention, the at least one junction box is provided with integrated box flaps, and wherein the at least one junction box is fixed to a duct connection using the integrated box flaps.

According to a further aspect of the present invention, the at least one PCB board includes a plurality of PCB boards, and wherein the plurality of PCB boards includes at least one of a hoistway access control ("HAC"), a floor control board ("FBC") and a floor option board ("FOB").

According to yet another aspect of the present invention, each of a seismic device, a door lock switch, a door sensor and a stop switch are wired to the at least one junction box.

The present invention is directed to simplifying installation of an elevator shaft signalization bundle in new applications. However, the present invention may be applicable to existing installations. The shaft signalization bundle includes printed circuit boards ("PCB's"), and power supply and signal cables between the PCB's, which are installed in elevator landings within the elevator shaft. These PCB's may be, for example, floor display units, call giving units, alarm units, and any type of sensor unit, such as landing door sensor units. The PCB's of different floors are connected together via their respective signalization and power supply cables running in a wire duct located within the elevator shaft. The signalization and power supply cables communicate with each other via a serial data bus. Some of the boards, including a floor option board ("FOB"), provide serial-to parallel conversion to interface with call buttons, elevator car position indicators, etc.

According to the present invention, PCB boards of a plurality of floors, including 2-4 floors, are first installed in a common junction box in connection with a wire duct. Thereafter, hall call buttons of each landing are wired to the common junction box. This is advantageous, since there is no need for disassembly after the complete signalization bundle is tested in the factory. This invention is beneficial especially for low-rise elevators with 2-4 floors, but it may be implemented to buildings with more than four floors.

Even though the preferred embodiment of the invention discloses installing at least one PCB board and their cabling into a common junction box, an alternative solution is to integrate a plurality of PCB boards into one common PCB board to be mounted in the common junction box in order to reduce the amount of cabling required.

A junction control box may be mounted in connection to a hoistway wire duct and have an interface for connecting to landing fixtures of at least two separate landings. Further, a non-limiting embodiment of the present invention includes an elevator installation having at least two landings, an elevator control unit, a junction control box, a wire duct, landing fixtures (e.g., call giving panels, car position indicators, alarm units, etc.) connected to the junction control box, and the junction control box being connected to an elevator control unit via a serial data bus. The serial data bus may include a local operating network ("LON") bus or controlled area network ("CAN") bus. Also, the present invention is directed to an elevator installation method comprising installing shaft bundle boards in a junction box.

The enclosure of the junction box is to be designed for code compliance and required certifications. Further, a connector strip of the junction box may be color coded for wiring/lay-in duct cable compatibility and connection without need of wiring diagrams in hand.

The present invention includes the connection of a maintenance access panel ("MAP") to the junction box. The MAP is a longitudinal control cabinet mounted to the landing door frame.

Further, a controller (i.e., elevator control unit) is mounted to the landing door frame.

This new solution allows for pre-wiring of safety features on the PCB boards and concentrating several boards into a single junction box without losing the modularity of the current of LON-based shaft bundle. Further, one or more junction boxes may be installed for every four (4) floors of an elevator.

Further scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same reference numerals have been used to identify the same or similar elements throughout the several views.

Currently, a shaft bundle is tested in a factory, but then disassembled in the field in order to install each board in a metallic board holder enclosure at each floor. This modularity is convenient because it works with elevators of any number of floors and inter-floor distances. However, there is a wide application range in which it is more practical to have a single enclosure for several boards and have the landing buttons wired all to this enclosure. Further, it is preferable for elevators comprising 2-4 floors to have a single enclosure for several boards and have the landing buttons wired all to this enclosure.

According to the present invention, all hoistway access control ("HAC"), floor control board ("FCB") and FOB boards required for a specific elevator are assembled inside a junction box at the factory, the junction box being a single metallic enclosure, and the PCB boards being prewired to each other and being tested. The junction box is provided to an elevator installation with the PCB boards fixed therein, and the junction box includes a multi-conductor coil wired from the boards. The multi-conductor coil is wired to an elevator controller during installation.

Safety features of the elevator may be prewired between the boards leading to a connector strip to receive the wires for landing interlocks directly (for bottom and top floors). This allows for the complete shaft bundle to be tested at the factory during assembly and eliminates the need to disassemble the bundle in the field during installation. The safety features include the HAC, the FCB, and the FOB, and the Fireman's drive ("FRD"), and any other known elevator safety feature.

The junction box may be placed at the top of the hoistway wire duct for a two (2) floor elevator, or near the middle of travel for four (4) floor elevators. Then, lay-in duct cable/ electrical wiring is provided to electrically connect the junction box multi-conductor coil/connector strip to the hall call button(s) of each landing.

The elevator may include a plurality of landings and at least one of a seismic device, a door lock switch, a door sensor and a stop switch. At least one or all of a seismic device, door switch, door sensor and stop switch are electrically connected via wiring to at least one junction box. If the elevator includes a plurality of junction boxes, a respective seismic device, door switch, door sensor and stop switch may be wired to one or all of the junction boxes.

Figure 1:
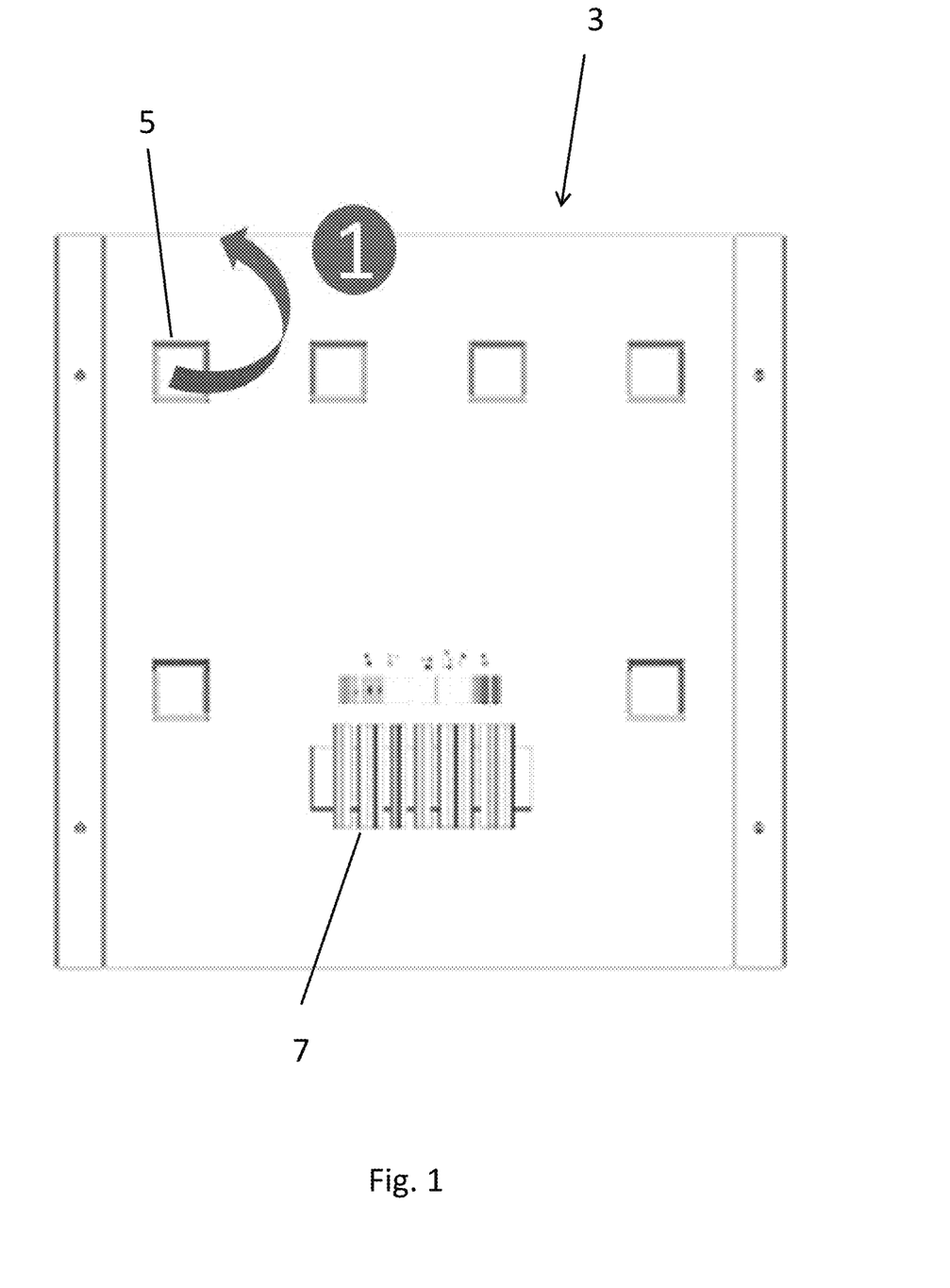
FIG. 1 illustrates a top view of the junction box including a plurality of knock-out squares and an integrated multi-conductor.
Figure 3:
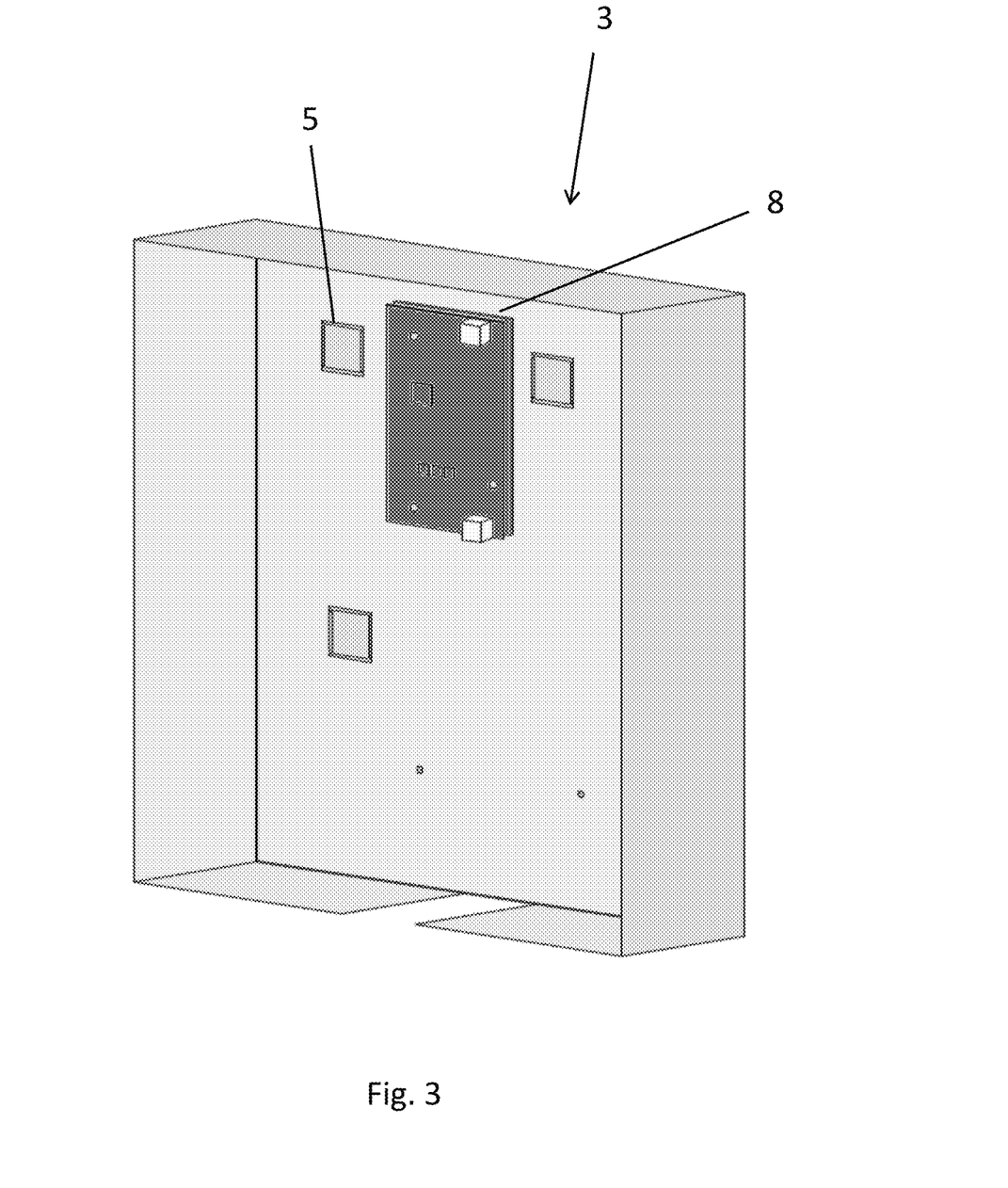
FIG. 3 illustrates an isometric view of the junction box having an installed PCB board.

FIGS. 1 and 3 illustrate a junction box 3 including knock-out portions 5 and an integrated multi-conductor coil 7. A user knocks-out knock-out portions 5, as shown by the illustrated arrow, to form respective apertures. Thereafter, at least one PCB board 8 is affixed to a respective one of the junction box apertures via a holder 4. Each holder may be comprised of plastic, metal, a combination of plastic and metal, or any other material.

Figure 4:
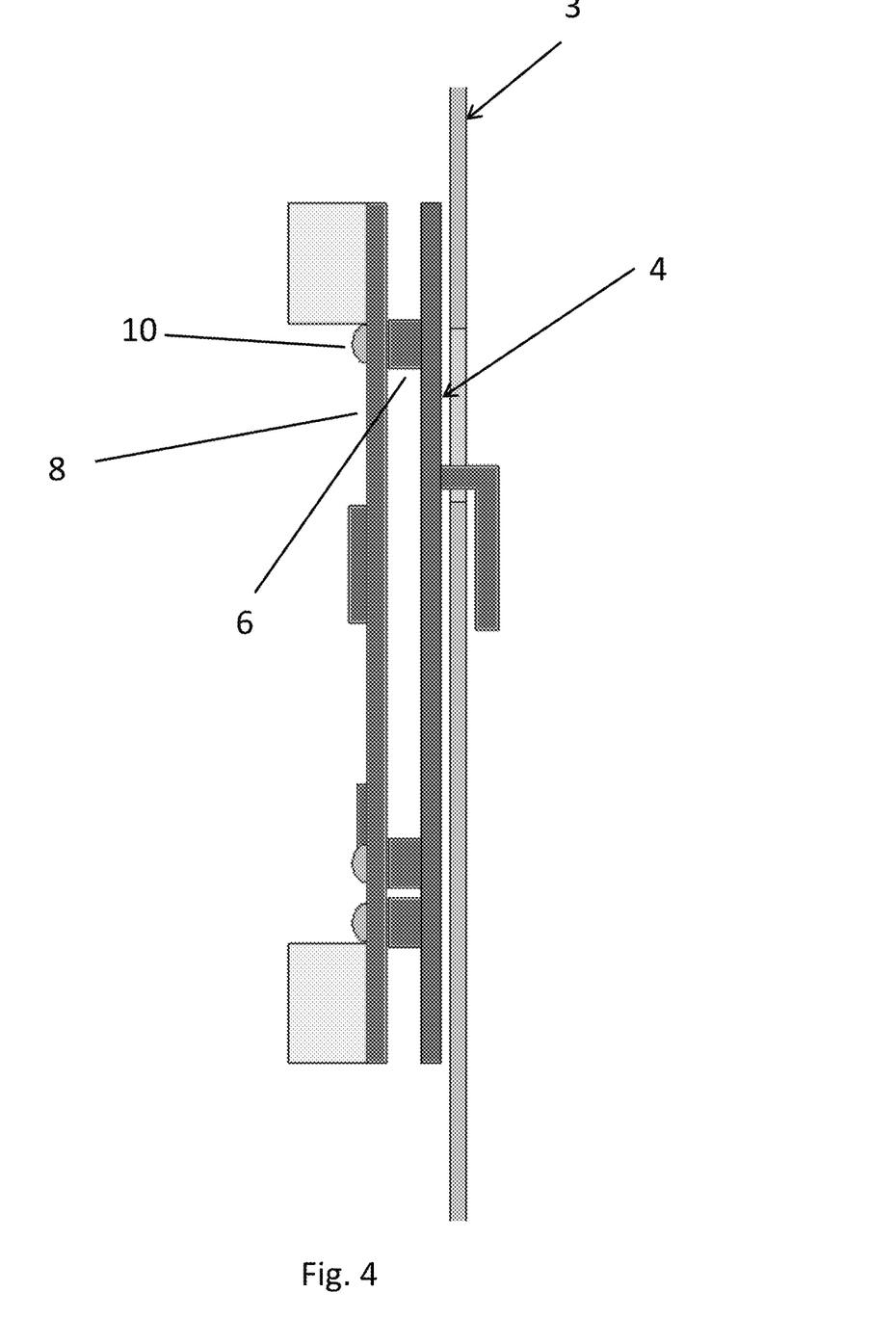
FIG. 4 illustrates a side view of a PCB board attached to an aperture of the junction box using a holder.

As shown in FIG. 4, the holder extends through the respective aperture and includes a portion extending perpendicular to an axis of the respective aperture to fix the holder to the junction box, and a plurality of projection portions 6 extending toward the respective PCB board 8. Each PCB board 8 being affixed to a respective holder at each projection portion 6 via a respective fastening member 10. Each fastening member 10 may be a screw, bolt, pin, or the like. For example, the screw or bolt may engage an internally threaded portion of the respective projection portion 6, and the pin may have a friction-fit engagement with an internal aperture of the respective projection portion 6.

Figure 2:
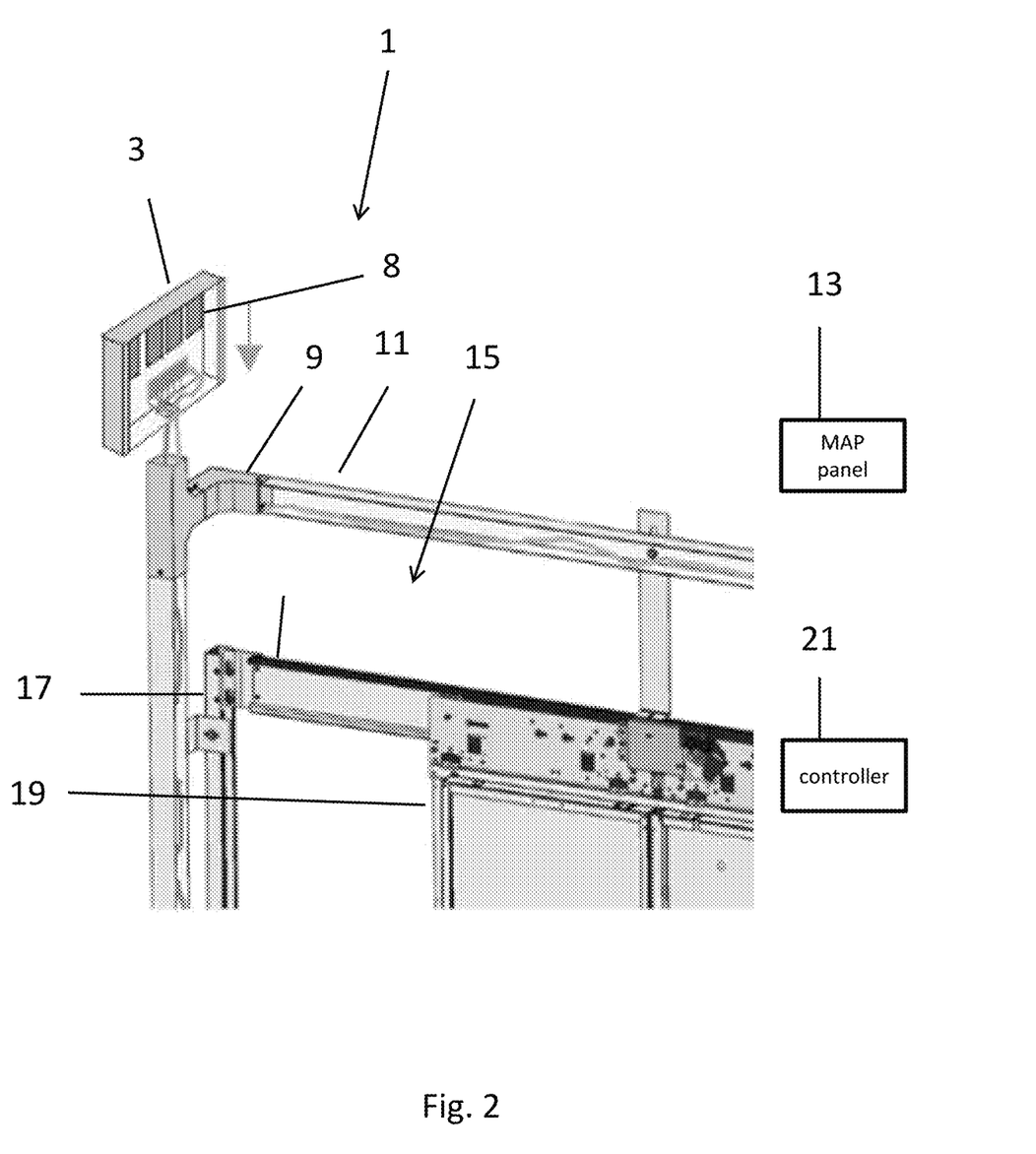
FIG. 2 illustrates an isometric view of the junction box installed in an elevator shaft and its corresponding wiring.

Then, a user affixes the junction box 3 to a duct connection 9 (illustrated in FIG. 2).

Figure 5:
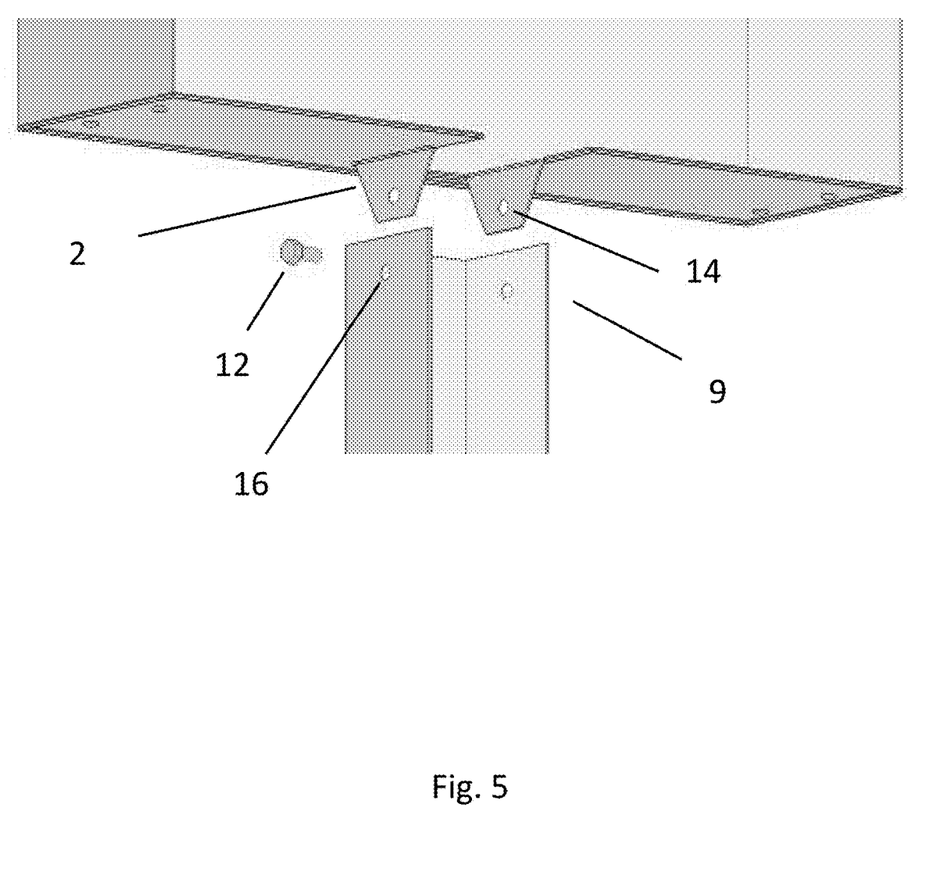
FIG. 5 illustrates an isometric view of the junction box having box flaps that are inserted into the duct connection and fastened using a fastening member.

FIG. 2 illustrates the junction box 3 being placed at a top of an elevator hoistway 15, however, the junction box 3 may be placed at any location within the elevator hoistway 15. The junction box 3 is provided with at least one PCB board 8 and has integrated box flaps 9 (shown in FIG. 5). FIG. 2 further illustrates, via the downwardly pointing arrow (i.e., pointing towards the bottom of the elevator shaft), the movement of the junction box 3 for fixing the junction box 3 to a duct connection 9 via the integrated box flaps 2. As shown in FIG. 5, the box flaps 2 of the junction box 3 engage an inner surface of the duct connection 9 to fix the junction box 3 to the duct connection 9. Specifically, each box flap 9 is provided with an aperture 14, and once the junction box 3 is moved to abut against the duct connection 9, the aperture 14 of each box flap 9 lines up with a respective aperture 16 of the duct connection 9, and a respective fastening member 12 is used to affix each box flap 2 to the duct connection 9. Each fastening member 12 may be any known type of fastening connection, including a screw, a bolt and nut connection, and the like.

Further, FIG. 2 illustrates a plurality of duct sections 11 extending from the duct connection 9 and wiring extending from the integrated multi-conductor 7, through the respective duct section 11 and towards the controller 21. The duct sections 11 are configured to enclose elevator wiring, including wiring for connection of the junction box 3 to hall call buttons, door sensors, seismic devices, door switches, stop switches, light switches, weight sensors, and the like.

Figure 6:
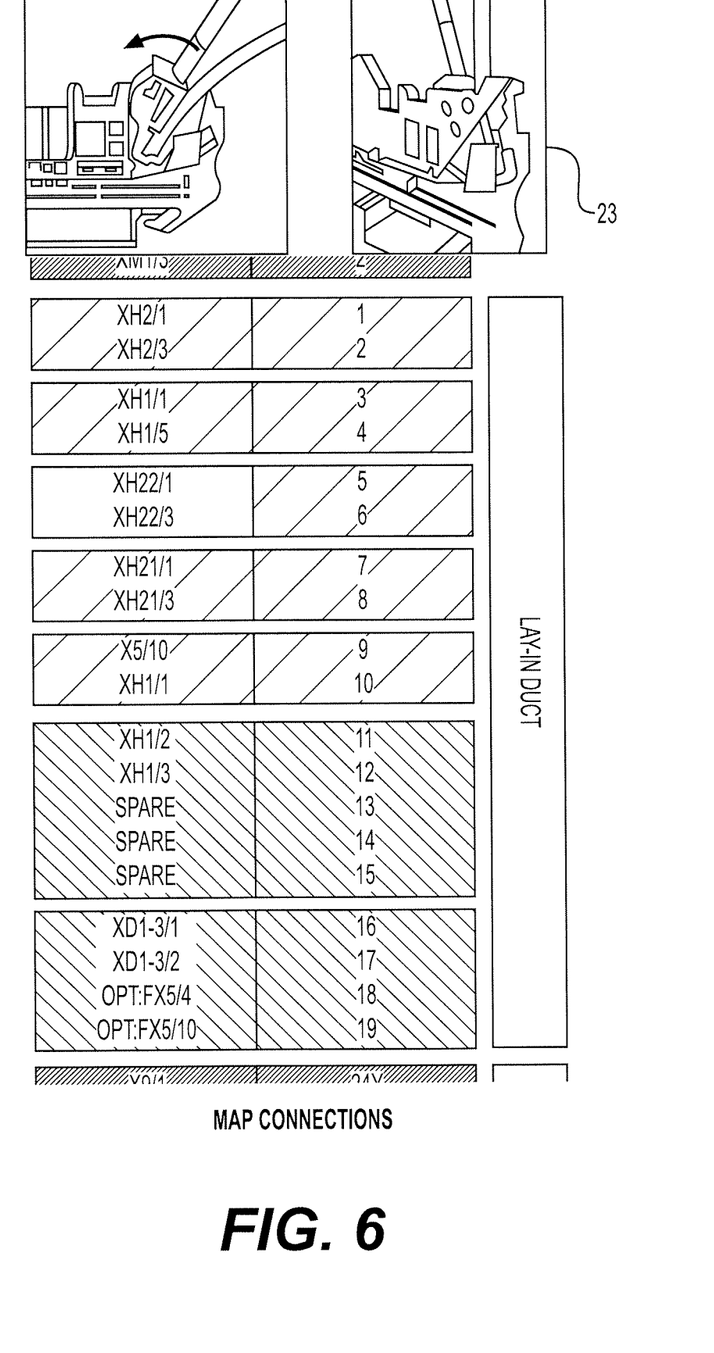
FIG. 6 illustrates the MAP connections to a lay-in duct.

FIG. 6 illustrates how a plug part (not shown) of a connector is connected to a MAP panel 13. Specifically, FIG. 6 illustrates the type of displacement connector used in the terminal block in the junction box. The tool 23 shown is used to form the connections, and may be a known fastening device, such as a screwdriver. The MAP panel 13 is a longitudinal control cabinet mounted to a frame of a landing door 19, in which the controller 21 (i.e., an elevator control unit) is located. The connector connects one or all of hall call buttons, door sensors, seismic devices, door switches, stop switches, light switches, weight sensors, and the like to at least one junction box. The junction box connections may be color coded.

Figure 7:
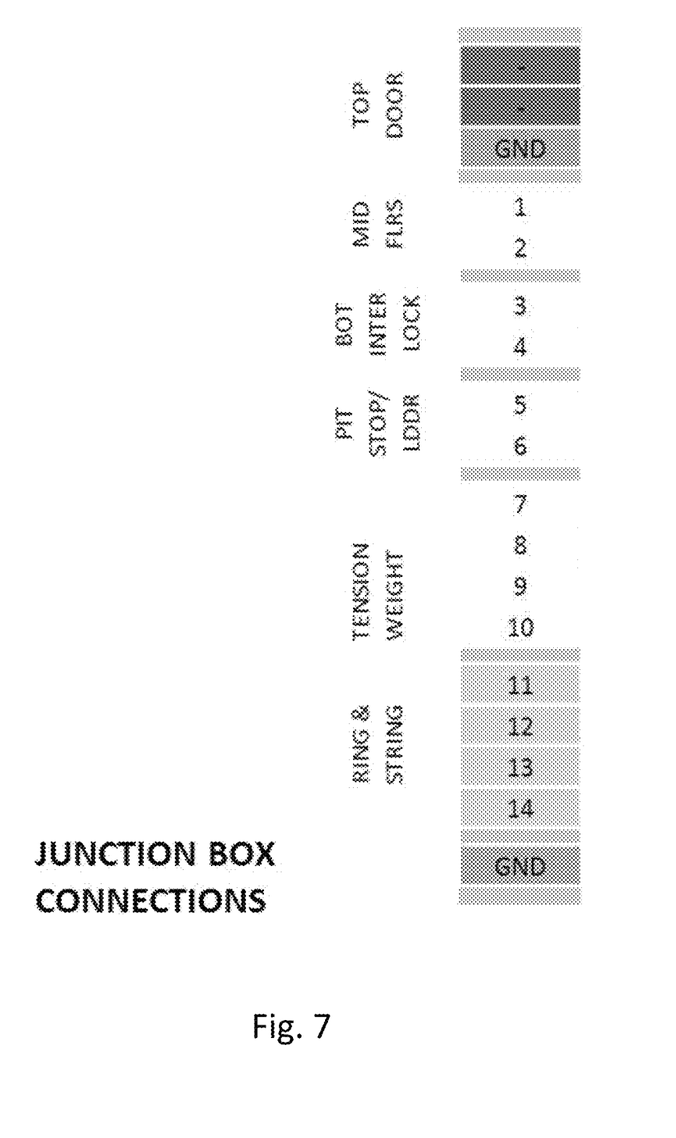
FIG. 7 illustrates various junction box connections.

FIG. 7 illustrates various junction box connections. "Ring & String," "Pit/Stop LDDR," "Bot Inter Lock," "Mid FLRS," and "Top Door" are the various devices connected into the junction box. However, there may be additional devices connected to the junction box, including any device known in the art. Ring & String devices are seismic devices to indicate derailment of an elevator car or a counterweight, Bot Inter Lock, Mid FLRS and Top Door are door lock switches that detect the locking of respective doors. Specifically, the Bot Inter Lock detects the opening of a bottom door, the Top Door detects the opening of the top floor, and Mid FLRS detects floors between the top floor and the bottom floor. Further, Pit/Stop LDDR is a stop switch in an elevator pit to stop elevator car movement from the pit.

Figure 8:
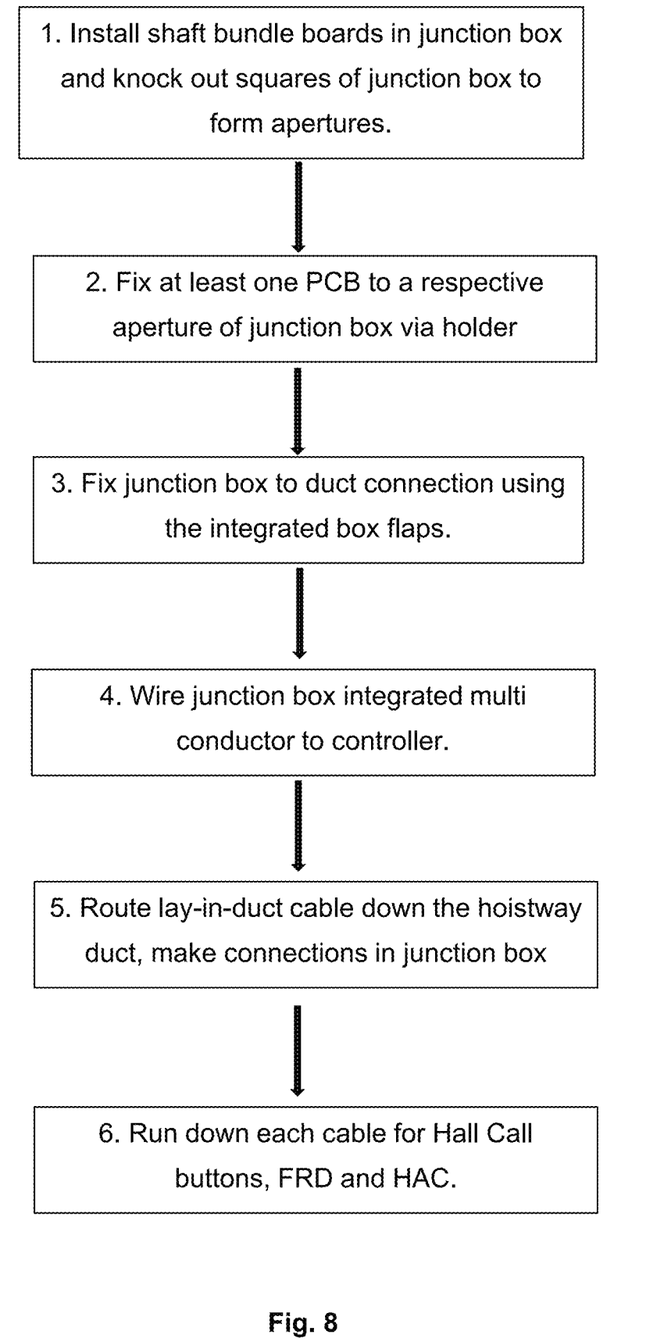
FIG. 8 illustrates a block diagram including the steps installing the junction box.

FIG. 8 illustrates a block diagram of a method of the present invention, including the steps of installing shaft bundle boards in a junction box, knocking out perforated/knock-out squares of the junction box, fixing at least one PCB to a respective aperture of junction box via a holder, fixing the junction box to at least one duct connection using integrated box flaps, routing the junction box integrated multi conductor towards a controller, routing lay-in-duct cable down the hoistway duct and making connections in junction box, and running down each cable for hall call buttons, FRD and HAC as needed.

The method may further comprise making a connection to a maintenance access panel ("MAP panel") using color coded labels, routing lay-in-duct cable/electrical wiring down the hoistway duct and making connections in the junction box according to color coded labels, and running down each cable for hall call buttons, FRD and HAC as needed.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for installing at least one junction box in an elevator hoistway of an elevator, the method comprising:
    providing at least one junction box, each junction box including a plurality of knock-out portions and integrated box flaps;
    knocking out at least one of the plurality of knock-out portions of the at least one junction box to form a respective aperture; and
    affixing at least one PCB board to the respective aperture via a respective holder,
    wherein the elevator includes a plurality of landings and at least one of a seismic device, a door lock switch, a door sensor and a stop switch,
    wherein the method further comprises:
    fixing the at least one junction box to a duct connection using the integrated box flaps,
    electrically connecting the at least one junction box to a controller via a serial data bus through the duct connection;

electrically connecting the at least one of the seismic device, door lock switch, door sensor and stop switch to the at least one junction box through the duct connection; and electrically connecting hall call buttons to the at least one junction box from each of the plurality of landings, and wherein the elevator further comprises a wire duct and landing fixtures connected to the at least one junction box.

2. The method according to claim 1, wherein the at least one PCB board includes a plurality of PCB boards and an integrated multi-conductor coil wired to each of the PCB boards.

3. The method according to claim 1, wherein the at least one junction box is fixed at an upper portion of the elevator hoistway or at a portion near a middle of travel of an elevator car.

4. The method according to claim 2, wherein the plurality of PCB boards includes at least one of a hoistway access control ("HAC"), a floor control board ("FBC") and a floor option board ("FOB").

5. The method according to claim 1, wherein each of the seismic device, the door lock switch, the door sensor and the stop switch are wired to the at least one junction box.

6. The method according to claim 1, wherein the serial data bus is a local operating network ("LON") bus or a controlled area network ("CAN") bus.

7. The method according to claim 1, wherein the at least one junction box includes a plurality of junction boxes, wherein the elevator includes more than four floors, and wherein one of the plurality of junction boxes is fixed to the elevator hoistway every four floors.

8. The elevator according to claim 1, wherein each holder extends through the respective aperture and includes a portion extending perpendicular to an axis of the respective aperture to fix the respective holder to the junction box, and wherein the at least one PCB board is affixed to the respective holder via a fastening member.

9. A method for installing at least one junction box in an elevator hoistway of an elevator, the method comprising:

providing at least one junction box, wherein each junction box includes:
an integrated multi-conductor coil;
a plurality of knock-out portions; and
integrated box flaps;

knocking out at least one of the plurality of knock-out portions of the at least one junction box to form a respective aperture;

affixing a PCB board to the respective aperture via a respective holder; and wiring the integrated multi-conductor coil to the PCB board, wherein the elevator includes a plurality of landings a wire duct and landing fixtures, wherein the wire duct and the landing fixtures are connected to the at least one junction box, and wherein the method further comprises:

fixing the at least one junction box to a duct connection using the integrated box flaps;

electrically connecting the at least one junction box to an elevator control unit via a serial data bust through the duct connection;

electrically connecting a lay-in duct cable via the duct connection to a connector strip of the at least one junction box; and electrically connecting hall call buttons into the at least one junction box from each of the plurality of landings.

10. An elevator, comprising:
a plurality of landings;
a controller;
landing fixtures;
at least one junction box including:
at least one PCB board, wherein each PCB board is affixed to an aperture of the at least one junction box via holders;
integrated box flaps; and
an integrated multi-conductor coil wired to each PCB board;
a duct connector connected to the at least one junction box; and
a plurality of wiring ducts connected to the duct connector, wherein the at least one junction box is fixed to the duct connector using the integrated box flaps, wherein the at least one junction box is electrically connected to the controller via a serial data bus through the duct connection, wherein the lay-in duct cable is electrically connected through the duct connector to a connector strop of the at least one junction box, wherein hall call buttons are electrically connected into the at least one junction box from each of the plurality of landings, and wherein the wire ducts and the landing fixtures are connected to the at least one junction box.

11. The elevator according to claim 10, wherein the at least one PCB board includes a plurality of PCB boards, and wherein the plurality of PCB boards includes at least one of a hoistway access control ("HAC"), a floor control board ("FBC") and a floor option board ("FOB").

12. The elevator according to claim 10, wherein each of a seismic device, a door lock switch, a door sensor and a stop switch are wired to the at least one junction box.

* * * * *